(12) United States Patent
Steele, Jr. et al.

(10) Patent No.: US 10,147,044 B2
(45) Date of Patent: Dec. 4, 2018

(54) METHOD AND SYSTEM FOR LATENT DIRICHLET ALLOCATION COMPUTATION USING APPROXIMATE COUNTERS

(71) Applicant: Oracle International Corporation, Redwood Shores, CA (US)

(72) Inventors: Guy L. Steele, Jr., Lexington, MA (US); Jean-Baptiste Tristan, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 544 days.

(21) Appl. No.: 14/820,169

(22) Filed: Aug. 6, 2015

(65) Prior Publication Data

US 2016/0224900 A1    Aug. 4, 2016

Related U.S. Application Data

(60) Provisional application No. 62/112,007, filed on Feb. 4, 2015.

(51) Int. Cl.
*G06F 17/30*     (2006.01)
*G06N 7/00*      (2006.01)
(Continued)

(52) U.S. Cl.
CPC ............ *G06N 7/005* (2013.01); *G06F 9/5066* (2013.01); *G06F 17/277* (2013.01); *G06F 17/2785* (2013.01); *G06F 17/3071* (2013.01)

(58) Field of Classification Search
CPC ..... G06N 7/005; G06F 9/5066; G06F 17/277; G06F 17/2785; G06F 17/3071
See application file for complete search history.

(56) References Cited

U.S. PATENT DOCUMENTS 8,484,245 B2    7/2013    Ha-Thuc
9,767,416 B2    9/2017    Tristan
(Continued)

OTHER PUBLICATIONS

Pierre-Yves Louis, "Automates Cellulaires Probabilistes : mesures stationnaires, mesures de Gibbs associees et ergodicite", HAL Id: tel-00002203, Submitted on Dec. 26, 2002, 207 pages.
(Continued)

*Primary Examiner* — Etienne P Leroux
*Assistant Examiner* — Husam Turki Samara
(74) *Attorney, Agent, or Firm* — Hickman Palermo Becker Bingham LLP

(57) ABSTRACT

Herein is described a data-parallel algorithm for topic modeling in which the memory requirements are streamlined for implementation on a highly-parallel architecture, such as a GPU. Specifically, approximate counters are used in a large mixture model or clustering algorithm (e.g., an uncollapsed Gibbs sampler) to decrease memory usage over what is required when conventional counters are used. The decreased memory usage of the approximate counters allows a highly-parallel architecture with limited memory to process more computations for the large mixture model more efficiently. Embodiments describe binary Morris approximate counters, general Morris approximate counters, and Csűrös approximate counters in the context of an uncollapsed Gibbs sampler, and, more specifically, for a Greedy Gibbs sampler.

20 Claims, 8 Drawing Sheets

(51) Int. Cl.
G06F 9/50 (2006.01)
G06F 17/27 (2006.01)

(56) References Cited

U.S. PATENT DOCUMENTS

| | | |
|---|---|---|
| 2009/0192980 A1 | 7/2009 | Beyer |
| 2012/0095952 A1 | 4/2012 | Archambeau |
| 2012/0117008 A1 | 5/2012 | Xu |
| 2013/0073387 A1 | 3/2013 | Heath |
| 2013/0159236 A1 | 6/2013 | Vladislav |
| 2014/0129510 A1 | 5/2014 | Vladislav |
| 2014/0149433 A1 | 5/2014 | Lakshminarayan |
| 2014/0181214 A1 | 6/2014 | Price |
| 2015/0095277 A1 | 4/2015 | Tristan et al. |
| 2015/0193535 A1 | 7/2015 | Balmin |
| 2015/0268930 A1 | 9/2015 | Lee |
| 2016/0210718 A1 | 7/2016 | Tristan et al. |
| 2016/0224544 A1 | 8/2016 | Tristan et al. |
| 2016/0224902 A1 | 8/2016 | Steele, Jr. et al. |
| 2016/0330144 A1 | 11/2016 | Dymetman |
| 2016/0350411 A1 | 12/2016 | Tristan et al. |
| 2017/0039265 A1 | 2/2017 | Steele, Jr. |
| 2017/0154077 A1 | 6/2017 | Kang |

OTHER PUBLICATIONS

D. A. Dawson, "Synchronous and Asynchronous Reversible Markov Systems", Canad. Math. Bull. vol. 17 (5), 1975, 17 pages.
D.P. Landau et al., "Test of parallel updating in Ising model simulation", HAL Id: jpa-00210932, Submitted on Jan. 1, 1989, 5 pages.
Lebowitz et al., "Statistical Mechanics of Probabilistic Cellular Automata", Journal of Statistical Physics, vol. 59, Nos. 1/2, 1990, 54 pages.
Li et al., "Reducing the Sampling Complexity of Topic Models", ACM, dated Aug. 2014, 10 pages.
Mairesse et al., "Accepted Manuscript", Around probabilistic cellular automata, Theoretical Computer Science, dated Sep. 29, 2014, 48 pages.
A. U. Neumann et al., "Finite size scaling study of dynamical phase transitions in two dimensional models : Ferromagnet, symmetric and non symmetric spin glasses", J. Phys. France 49 (1988), 10 pages.
Morris, Robert, "Counting Large Numbers of Events in Small Registers", Programming Techniques, AMC, dated Oct. 1978, 3 pages.
Yee Whye The et al, "A Collapsed Variational Bayesian Inference Algorithm for Latent Dirichlet Allocation", dated 2007, 8 pages.
Rauch, Eric, "Discrete, amorphous physical models", for a special issue on the Digital Perspectives workshop, dated Jul. 2001, 22 pages.
Tristan et al., "Efficient Training of LDA on a GPU by Mean-for-Mode Estimation", Proceedings of the 32 nd International Conference on Machine Learning, Lille, France, 2015, 10 pages.
Tristan et al., "Learning Topics with Stochastic Cellular Automata Dynamics", 9 pages.
Vichniac, Grrard Y., "Simulating Physics With Cellular Automata", North-Holland, Amsterdam, Elsevier Science Publishers B.V., dated 1984, 21 pages.
Walker, Alastair J., "An Efficient Method for Generating Discrete Random Variables With General Distributions", dated 1977, 4 pages.
Wikipedia the free encyclopedia, "alias method", https://en.wikipedia.org/wiki/Alias_method, last viewed on Sep. 24, 2015, 2 pages.
Miklos, Csuros, "Approximate counting with a oating-point counter", dated 2010, 16 pages.
U.S. Appl. No. 14/755,312, filed Jun. 30, 2015, Office Action, dated Oct. 3, 2016.
Tristan, U.S. Appl. No. 14/316,186, filed Jun. 26, 2014, Final Office Action, dated May 11, 2017.
Tristan, U.S. Appl. No. 14/599,272, filed Jan. 16, 2015, Office Action, dated Sep. 25, 2017.
Tristan, U.S. Appl. No. 14/316,186, filed May 26, 2014, Advisory Action, dated Aug. 3, 2017.
Tristan, U.S. Appl. No. 14/599,272, filed Jan. 16, 2015, Final Office Action, dated Nov. 15, 2017.
Goodman et al., "Church: A Language for Generative Models", In Proceedings of the 24th Conference on Uncertainty in Artificial Intelligence, UAI 2008, pp. 220-229, dated 2008, 10 pages.
Liu et al., "PLDA+:Parallel Latent Dirichlet Allocation with Data Placement and Pipeline Processing", ACM, dated 2011, 18 pages.
Kruschke, John. Doing Bayesian Data Analysis: A Tutorial Introduction with R . Academic Press, 2010.
Koller, D., McAllester, D., and Pfeffer, A., "Effective Bayesian Inference for Stochastic Programs". In Proceedings of the 14th National Conference on Artificial Intelligence, dated 1997, 8 pages.
Jiang et al., "A Method of Accelerating LDA Program with GPU", 2012 Third International Conference on Networking and Distributed Computing IEEE, 2012, 4 pages.
Hoffman, M., Blei, D., Wang, C., and Paisley, J. "Stochastic Variational Inference", Journal of Machine Learning Research , 14:1303-1347, dated 2013, 45 pages.
Hoffman, M. D. and Gelman, A., "The No-U-turn Sampler: Adaptively Setting Path Lengths in Hamiltonian Monte Carlo", Journal of Machine Learning Research , In press., dated Apr. 2014, 31 pages.
Hillis,W. D. and Steele, Jr., G. L., "Data Parallel Algorithms", Communications of the ACM , 29(12):1170-1183, 1986, 14 pages.
Hershey et al., "Accelerating inference:Towards a Full Language,", compiler and hardwarestack. CoRR , abs/1212.2991, 2012, 8 pages.
Kiselyov, O. and Shan, C.-C. "Embedded Probabilistic Programming", In Proceedings of the IFIP TC 2 Working Conference on Domain-Specific Languages , 2009, pp. 360-384. Springer-Verlag, 25 pages.
Goodman, N. D. "The Principles and Practice of Probabilistic Programming"., Proceedings of the 40th annual ACM SIGPLAN-SIGACT Symposium on Principles of Programming Languages, dated 2013, 3 pgs.
Marsaglia, G. and Tsang, W. W. A simple method for generating gamma variables. ACM Trans. Math. Softw. , 26 (3):363-372, 2000.
Freitas et al., "Bayesian Latent Semantic Analysis of Multimedia Databases" Technical Report, dated Oct. 22, 2001, 36 pages.
Chang et al., "Reading Tea Leaves: How Humans Interpret Topic Models" dated 2009, 9 pages.
Celeux et al., "On Stochastic Versions of the EM Algorithm", INRIA, dated Mar. 1995, 25 pages.
Blelloch, G. E. "Programming Parallel Algorithms". Communications of the ACM, 39:85-97, 1996, 13 pages.
Blei, David, "Probabilistic Topic Models", Surveying a suite of algorithms that offer a solution to managing large document archives, Apr. 2012 | vol. 55 | No. 4 | communications, AMC, 8 pages.
Blei et al., "Latent Dirichlet Allocation" Journal of Machine Learning Research 3, dated 2003, 30 pages.
Bache, K. and Lichman, M. "UCI Machine Learning Repository", 2013. URL http://archive.ics.uci.edu/ml, 2 pages.
Asuncion et al., "On Smoothing and Inference for Topic Models", UAI 2009, 8 pages.
Lunn, D., Spiegelhalter, D., Thomas, A., and Best, N. "The BUGS Project: Evolution, Critique and Future Directions", Statistics in Medicine , 2009, 19 pages.
Griffiths, T. L. and Steyvers, M. "Finding Scientific Topics". In Proceedings of the National Academy of Sciences of the United States of America , vol. 101, 2004, 8 pages.
Porteous et al., "Fast Collapsed Gibbs Sampling for Latent Dirichlet Allocation" KDD' dated 2008, ACM, 9 pages.
Yao et al., "A. Efficient Methods for Topic Model Inference on Streaming Document Collections", 15th ACM SIGKDD International Conference on Knowledge Discovery and Data Mining, AMC, 2009, 9 pages.
Yan et al., "Parallel Inference for Latent Dirichlet Allocation on Graphics Processing Units" dated 2009, 9 pages.
Wikipedia, "Approximate Counting Algorithm", last accesed on May 7, 2015, http://en.wikipedia.org/wiki/Approximate_counting_algorithm, 2 pages.

(56) References Cited

OTHER PUBLICATIONS

Wang et al., "PLDA: Parallel Latent Dirichlet Allocation for Large-Scale Applications" AAIM, dated 2009, 14 pages.

Wallach et al., "Rethinking LDA: Why Priors Matter" dated 2009, 9 pages.

Wallach et al., "Evaluation Methods for Topic Models" Proceedings of 26th International Conference on Machine Learning Monteral, Canada, dated 2009, 8 pages.

Venugopal, D. and Gogate, V. "Dynamic Blocking and Collapsing for Gibbs Sampling", In 29th Conference on Uncertainty in Artificial Intelligence , UAI'13, 2013, 10 pages.

Thomas, A., Spiegelhalter, D. J., and Gilks, W. R. "BUGS: A Program to Perform Bayesian Inference Using Gibbs Sampling". Bayesian Statistics, 4:837-842, dated 1992, Oxford University Press.

Stucki, S., Amin, N., Jonnalageda, M., and Rompf, T., "What are the Odds?" Probabilistic programming in Scala. In Scala '13 , pp. 360-384. Springer-Verlag, 2013, 9 pages.

Low et al., "A New Framework for Parallel Machine Learning", CoRR , abs/1006.4990, dated 2010, 10 pages.

Rosen-Zvi et al., "Learning Author-Topic Models from Text Corpora", 2004 Uncertainty in AI Conference and the 2004 ACM SIGKDD Conference, dated 2010, AMC, 38 pages.

Lu et al., "Accelerating Topic Training on a Single Machine", APWeb dated 2013, 12 pages.

Plummer, Martyn. Jags: "A Program for Analysis of Bayesian Graphical Models Using Gibbs Sampling", Pro. of the 3rd International Workshop on Distributed Statistical Computing, Mar. 2013, 10 pgs.

Pfeffer, A. Figaro: "An Object-Oriented Probabilistic Programming Language", Technical report, Charles River Analytics, dated 2009, 9 pages.

Pfeffer, A. "The Design and Implementation of IBAL: A General-Purpose Probabilistic Language", Introduction to Statistical Relational Learning , pp. 399-433, 2007, 45 pages.

Pfeffer, A. "Creating and Manipulating Probabilistic Programs With Figaro", In 2nd International Workshop on Statistical Relational AI , 2012, 10 pages.

Newman et al., "Distributed Algorithms for Topic Models", Journal of Machine Learning Research, dated 2009, 28 pages.

Neal, Radford. "CSC 2541: Bayesian Methods for Machine Learning", 2013. Lecture 3, 20 pages.

Minka, T., Winn, J.M., Guiver, J.P., and Knowles, D.A. "Infer.NET 2.5", 2012. URL http://research.microsoft.com/infernet . Microsoft Research Cambridge, 4 pages.

McCallum et al. "Probabilistic Programming via Imperatively Defined Factorgraphs Advances in Neural Information Processing Systems 22" , pp. 1249-1257, 2009, 9 pages.

Yao et al., "Efficient Methods for Topic Model Inference on Streaming Document Collections", KDD, dated 2009, ACM, 9 pages.

Smola et al., "An Architecture for Parallel Topic Models" Proceedings of the VLDB Endowment, vol. 3, No. 1, dated 2010, 8 pages.

Dieter, Ahrens "An Alias Method for Sampling from the Normal Distribution", Computing, dated 1989, vol. 42, No. 2-3, p. 159.

Tristan, U.S. Appl. No. 14/932,825, filed Nov. 4, 2015, Office Action, dated Feb. 2, 2018.

Tristan, U.S. Appl. No. 14/599,272, filed Jan. 16, 2015, Advisory Action, dated Jan. 24, 2018.

Steele, U.S. Appl. No. 14/713,205, filed May 15, 2015, Office Action, dated Mar. 8, 2018.

Steele Jr, U.S. Appl. No. 14/821,511, filed Aug. 7, 2015, Office Action, dated Feb. 9, 2018.

Tristan, U.S. Appl. No. 14/932,825, filed Nov. 4, 2015, Interview Summary, dated May 3, 2018.

Steele Jr., U.S. Appl. No. 14/821,511, filed Aug. 7, 2015, Interview Summary, dated May 11, 2018.

Brown, U.S. Appl. No. 15/074,248, filed Mar. 18, 2016, Notice of Allowance, dated Apr. 24, 2018.

Tristan, U.S. Appl. No. 14/755,312, filed Jun. 30, 2015, Notice of Allowance, dated Mar. 10, 2017.

Tristan, U.S. Appl. No. 14/932,825, filed Nov. 4, 2015, Final Office Action, dated Jun. 26, 2018.

$$p(w, z, \theta, \phi) = \left[\prod_{i=1}^{M} \prod_{j=1}^{N_i} \text{cat}(w_{ij}|\phi_{z_{ij}}) \, \text{cat}(z_{ij}|\theta_i)\right] \left[\prod_{i=1}^{M} \text{dir}(\theta_i|\alpha)\right] \left[\prod_{i=1}^{K} \text{dir}(\phi_i|\beta)\right]$$

200

1. Initialize
    - Sample $\theta^{(0)} \sim \mathrm{Dir}(\alpha)$
    - Sample $\phi^{(0)} \sim \mathrm{Dir}(\beta)$ 2. For $\tau = 1, ..., T$
    - Sample $z^{(\tau+1)} \sim p(z|\theta^{(\tau)}, \phi^{(\tau)}, w)$
    - Evaluate $\theta^{(\tau+1)}$ and $\phi^{(\tau+1)}$ given by $$\theta_i^{(\tau+1)} = \mathbb{E}[\theta_i | z^{(\tau+1)}]$$
$$\phi_i^{(\tau+1)} = \mathbb{E}[\phi_i | z^{(\tau+1)}]$$

| Algorithm: Drawing the latent variables |
|---|
| 1: memclear wpt |
| 2: memclear tpd |
| 3: memclear vt |
| 4: for $m = 0$ to $M - 1$ in parallel do |
| 5:     float p[K] |
| 6:     for $i = 0$ to $N - 1$ do |
| 7:         float sum = 0; |
| 8:         int c_word = words[m][i] |
| 9:         for $j = 0$ to $K - 1$ do |
| 10:             sum += phis[j][c_word] * thetas[m][j] |
| 11:             p[j] = sum |
| 12:         end for |
| 13:         float stop = uniform() * sum; |
| 14:         for $j = 0$ to $K - 1$ do |
| 15:             if *stop* < p[j] then |
| 16:                 break |
| 17:             end if |
| 18:         end for |
| 19:         atomic increment wpt[j][c_word] |
| 20:         atomic increment vt[j] |
| 21:         increment tpd[m][j] |
| 22:     end for |
| 23: end for |

400

| Algorithm: Estimation of the $\phi$ variables |
|---|
| 1: for $v = 0$ to $V - 1$ in parallel do |
| 2:   for $k = 0$ to $K - 1$ in parallel do |
| 3:     phis$[k][v]$ = (wpt$[k][v]$ + $\beta$) / (wt$[k]$ + $\beta V$) |
| 4:   end for |
| 5: end for |

| name of array (710) | number of elements (720) | integer counters (730) | bytes per element (740) | |
|---|---|---|---|---|
| | | | 8-bit approximate | 4-bit approximate (750) |
| $w$ | $MA$ | 4 | 4 | 4 |
| $z$ | $MA$ | 2 | 2 | 2 |
| $\theta$ | $MK$ | 4 | 4 | 4 |
| $\phi$ | $VK$ | 4 | 4 | 4 |
| topicCounts | $VK$ | 4 | 1 | $\frac{1}{2}$ |
| topicAssignments | $K$ | 4 | 1 | $\frac{1}{2}$ |
| documentCounts | $MK$ | 4 | 1 | $\frac{1}{2}$ |
| $w + z + \theta + documentCounts$ | | $6MA + 8MK$ | $6MA + 5MK$ | $6MA + \frac{9}{2}MK$ |

700

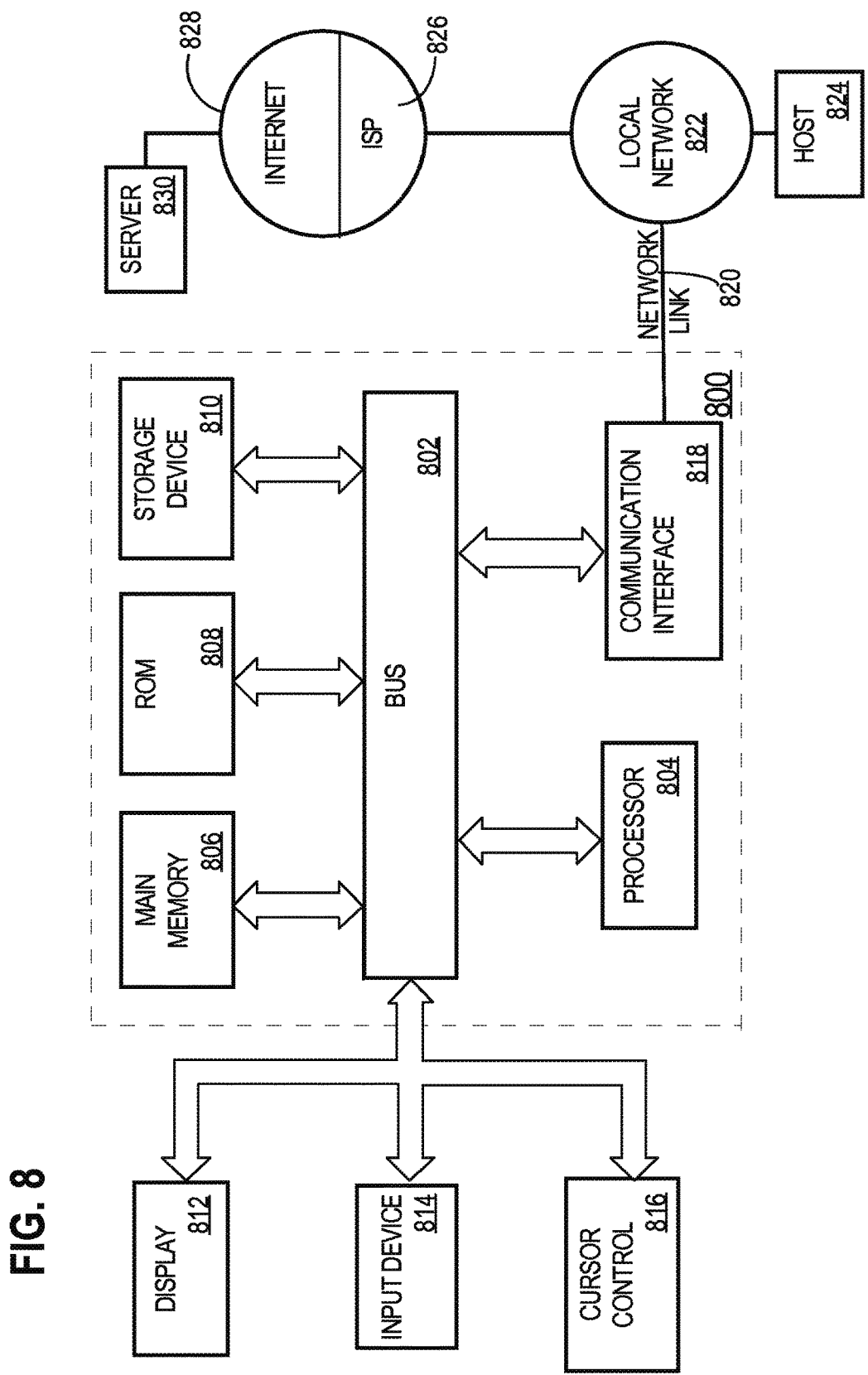

METHOD AND SYSTEM FOR LATENT DIRICHLET ALLOCATION COMPUTATION USING APPROXIMATE COUNTERS

BENEFIT CLAIM; CROSS-REFERENCE TO RELATED APPLICATION

This application claims the benefit of Provisional Appln. 62/112,007, filed Feb. 4, 2015, the entire contents of which is hereby incorporated by reference as if fully set forth herein, under 35 U.S.C. § 119(e).

This application is related to application Ser. No. 14/599,272 (titled "DATA-PARALLEL PARAMETER ESTIMATION OF THE LATENT DIRICHLET ALLOCATION MODEL BY GREEDY GIBBS SAMPLING"), filed Jan. 16, 2015, the entire contents of which is hereby incorporated by reference as if fully set forth herein.

FIELD OF THE INVENTION

The present invention relates to automatic and unsupervised discovery of topics in unlabeled data, and, more specifically, to reducing the memory requirement of topic discovery by implementing approximate counters in a Gibbs sampler sampling from a Dirichlet distribution.

BACKGROUND

The automatic and unsupervised discovery of topics in unlabeled data may be used to improve the performance of various kinds of classifiers (such as sentiment analysis) and natural language processing applications. Being unsupervised is both a blessing and a curse. It is a blessing because good labeled data is a scarce resource, so improving tools that depend on labeled data by extracting knowledge from the vast amounts of unlabeled data is very useful. It is a curse because the methods used to discover topics are generally computationally intensive.

A topic model—which is a probabilistic model for unlabeled data—may be used for the automatic and unsupervised discovery of topics in unlabeled data, such as a set of textual documents. Such a topic model is designed with the underlying assumption that words belong to sets of topics, where a topic is a set of words. For example, given a set of scientific papers, a topic model can be used to discover words that occur together (and therefore form a topic). One topic could include words such as "neuroscience" and "synapse", while another topic could include words such as "graviton" and "boson".

Topic models have many applications in natural language processing. For example, topic modeling can be a key part of text analytics such as Name Entity Recognition, Part-of-Speech Tagging, retrieval of information for search engines, etc. Unfortunately, topic modeling is generally computationally expensive, and it often needs to be applied on significant amounts of data, sometimes under time constraints.

The latest editions of GPUs have considerable computational potential, with even more potential for computational power. However, running topic modeling tasks on a GPU is challenging because GPUs expose a computational model that is very different from ordinary CPUs (e.g., processors and multicores). As such, algorithms that work well on ordinary CPUs need to be re-designed to be data-parallel for GPUs. Also, GPUs have small amounts of memory, and with enough parallelism, memory bandwidth becomes a bottleneck.

As such, it would be beneficial to implement a topic modeling algorithm that is highly data-parallel, and effectively manages memory issues in order to more efficiently create and sample topic models on a GPU.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 depicts an implementation of the Mean-for-Mode Gibbs sampler.

FIG. 7 depicts the calculations of the amount of memory needed for each of the seven principal arrays for Gibbs sampling.

FIG. 8 is a block diagram of a computer system on which embodiments may be implemented.

DETAILED DESCRIPTION

Figure 1:
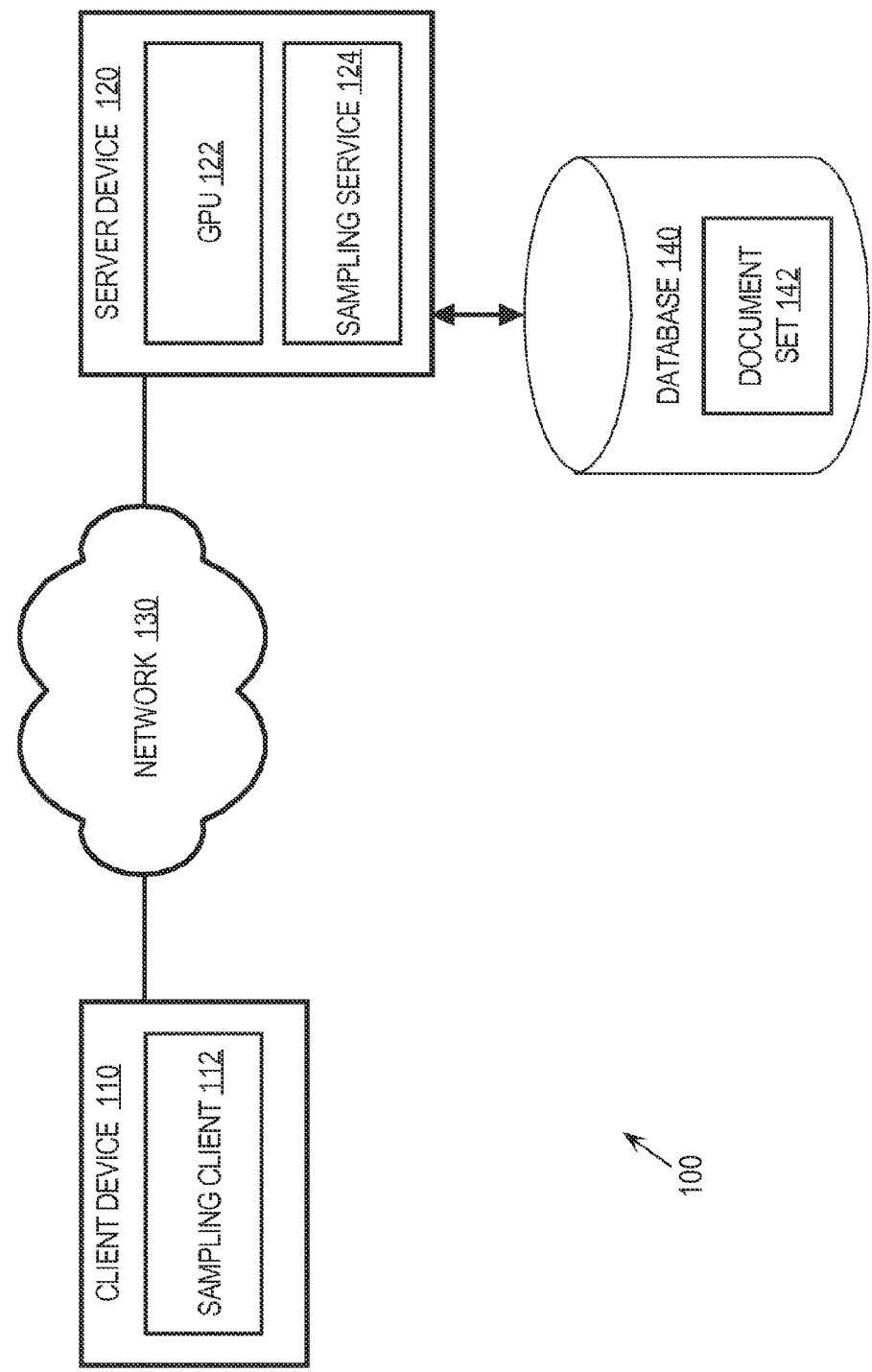
FIG. 1 is a block diagram that depicts an example network arrangement 100 for a highly-parallel model sampling system with reduced memory requirements.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is described a data-parallel algorithm for topic modeling in which the memory requirements are streamlined for implementation on a highly-parallel architecture. Given the considerable computational potential of latest editions of highly-parallel architectures and their potential for even more computational power, it is tempting to choose such architectures for machine learning tasks. The GPU architecture is a prime (though non-limiting) example of such considerable computational power. However, there are several challenges in efficiently using a GPU for machine learning. For example, GPUs are composed of many Single Program Multiple Data (SPMD) units which have the use of small amounts of memory, and with enough parallelism, memory bandwidth becomes a bottleneck.

In order to decrease the amount of memory required for the machine learning tasks associated with training large mixture models (such as LDA) and/or with clustering algorithms (such as a Gibbs sampler), approximate counters are substituted for more conventional counters used in these tasks. Mixture models are probabilistic models for representing the presence of subpopulations within an overall population. The replacement of conventional counters is also applicable in clustering algorithms (such as Gibbs sampling), which group entities in a population into clusters of entities, where the entities in a cluster are more similar in some way to the other entities in the cluster than to other entities in the population. The decreased memory usage by approximate counters allows a highly-parallel architecture (such as a GPU) with somewhat limited memory capabilities to process more computations for these machine learning tasks more efficiently.

For purposes of illustration, embodiments are described in the context of running, on a GPU, an uncollapsed Gibbs sampler (such as the Greedy Gibbs sampler presented in application Ser. No. 14/599,272) on an LDA statistical model. However, embodiments are not limited to the Greedy Gibbs sampler, or even an uncollapsed Gibbs sampler, and may or may not be implemented on a GPU. For example, embodiments are applicable to various GPU and SIMD architectures, with or without distributed memories. Furthermore, while LDA is a good example of a machine learning algorithm that suffers from at least the above-listed challenges of implementation on a GPU, embodiments are not limited to LDA. Embodiments are applicable to efficiently implement GPU samplers for other large mixture models or clustering algorithms, such as Pachinko allocation, and probabilistic latent semantic indexing (PLSI), etc.

Architecture for Sparse Model Sampling

FIG. 1 is a block diagram that depicts an example network arrangement 100 for a highly-parallel model sampling system with reduced memory requirements, according to embodiments. Network arrangement 100 includes a client device 110 and a server device 120 communicatively coupled via a network 130. Example network arrangement 100 may include other devices, including client devices, server devices, cluster nodes, and display devices, according to embodiments.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a sampling client 112. Sampling client 112 may be implemented in any number of ways, including as a stand-alone application running on client device 110, as a plugin to a browser running at client device 110, etc. Sampling client 112 may be implemented by one or more logical modules. Client device 110 may be configured with other mechanisms, processes and functionalities, depending upon a particular implementation.

Network 130 may be implemented with any type of medium and/or mechanism that facilitates the exchange of information between client device 110 and server device 120. Furthermore, network 130 may facilitate use of any type of communications protocol, and may be secured or unsecured, depending upon the requirements of a particular embodiment.

Server device 120 may be implemented by any type of computing device that is capable of communicating with client device 110 over network 130. In network arrangement 100, server device 120 is configured with a GPU 122 and a sampling service 124, which is described in further detail below. Any of the functionality attributed to GPU 122 and/or sampling service 124 herein may be performed by another entity running on server device 120, or by a GPU or other entity on client device 110 or on other devices that are communicatively coupled to network 130, according to embodiments. Server device 120 may be configured with other mechanisms, hardware, processes, and functionalities, depending upon a particular implementation.

Server device 120 is communicatively coupled to database 140. Database 140 maintains information for a document set 142. Database 140 may reside in any type of storage, including volatile and non-volatile storage (e.g., random access memory (RAM), a removable or disk drive, main memory, etc.), and may be implemented by one or more logical databases. The storage on which database 140 resides may be external or internal to server device 120.

Sampling client 112 and/or sampling service 124 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from other entities communicatively coupled to network 130. Further, sampling client 112 and/or sampling service 124 may send one or more communications, using any of the above protocols or any other communication protocol, over network 130 to other entities communicatively coupled to network 130, according to embodiments.

In an embodiment, each of the processes described in connection with sampling client 112, GPU 122, and/or sampling service 124 are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

LDA Data Model

LDA is a categorical mixture model for text documents with one set of mixing coefficients per document, where the components are shared across the corpus. It is a Bayesian model, and both the mixing coefficients and the components are given a Dirichlet prior. The distribution of LDA is described in FIG. 2, and reference is made to the introduction written by David M. Blei in "Probabilistic topic models", *Communication of the ACM*, 55(4), April 2012 (referred to herein as "Blei, 2012", and the entire contents of which is hereby incorporated by reference as if fully set forth herein), which provides more details about topic modeling and LDA.

Figure 2:
FIG. 2 depicts a formula that describes a mixed density for the LDA model.

Specifically, formula 200 of FIG. 2 describes a mixed density for the LDA model. M is the number of documents, $N_i$ is the size of document i, K is the number of topics, $w_{ij}$ is the $j^{th}$ word in document i, $z_{ij}$ is the topic associated to $w_{ij}$, $\theta_i$ is the distribution of topics in document i, $\phi_k$ is the distribution of vocabulary words in topic k. Functions "cat" and "dir" refer respectively to (a) the probability mass function of the Categorical distribution and (b) the probability density function of the Dirichlet distribution. The variables $\theta$ and $\phi$ can be integrated analytically; doing so leads to the collapsed form of LDA, from which the collapsed Gibbs sampler can be derived.

Mean-for-Mode Gibbs Sampling for LDA

In order to effectively train LDA on the GPU, an inference method that exposes a lot of parallelism is needed. For example, to make use of a modern NVIDIA GPU, it is reasonable to have an application with tens of thousands of threads, perhaps even millions. Unfortunately, the collapsed Gibbs sampler is a sequential algorithm. Indeed, what makes it a good algorithm is that integrating the parameters of LDA makes the latent variables directly dependent on each other.

As referred to above, one way to devise a highly parallel sampler is to not integrate the parameters before deriving the Gibbs sampler, thereby deriving an uncollapsed Gibbs sampler. In this case, the algorithm samples not only the latent variables, but the parameters of the model as well ($\phi$ and $\theta$). However, using such an uncollapsed Gibbs sampler for LDA requires more iterations than a collapsed Gibbs sampler to reach convergence.

Figure 3:
FIG. 3 depicts an algorithm for a Mean-for-Mode Gibbs sampler that uses a point estimate of the $\phi$ and $\theta$ parameters instead of sampling them.

To address this problem of requiring more iterations to reach convergence, the Mean-for-Mode Gibbs sampler uses a point estimate of the $\phi$ and $\theta$ parameters instead of sampling them. This algorithm is shown in formula 300 of FIG. 3 (for simplicity, the equations of formula 300 are presented modulo conditional independence). Formula 300 describes a Mean-for-Mode Gibbs sampler for LDA that produces T+1 samples. The Mean-for-Mode Gibbs sampler is similar to an uncollapsed Gibbs sampler, except that the stochastic steps that sample the parameters $\theta$ and $\phi$ are replaced with point estimates.

In practice, Mean-for-Mode sampling converges in fewer samples than standard uncollapsed Gibbs sampling. Further, the Mean-for-Mode Gibbs sampler seems to work well, with a convergence rate closer to that of the collapsed Gibbs sampler (rather than that of the traditional uncollapsed Gibbs sampler). Also, the topics resulting from experiments running a Mean-for-Mode Gibbs sampler seem to be of the same quality as the ones resulting from running a collapsed Gibbs sampler over the same data set (and most often, the two samplers result in very similar topics).

According to formula 300, the parameters are first drawn from the prior. Embodiments include other ways to do the initialization, while formula 300 focuses on the simplest form of the algorithm. Inside the main loop that generates samples, all of the latent variables are drawn given the parameters, as would be performed with a traditional at least partially uncollapsed Gibbs sampler for LDA. Then, the parameters are "simulated" by assigning to them the mean of their distribution, conditioned on all other variables of the model.

If the mode of the conditional distribution were used in the Gibbs sampler as a point estimate, it would result in an algorithm that is a stochastic expectation maximization. However, the mode of each distribution of interest may not exist because the distributions are Dirichlet distributions. As such, the conditional mean is used in formula 300 as a point estimate because the mean of a Dirichlet distribution is always defined. In fact, if $X \sim dir(\alpha)$ where $X$ is a random vector of size $K$, then $$\mathbb{E}[X_i] = \frac{\alpha_i}{\Sigma_k \alpha_i},$$

which is equal to $$\frac{(\alpha_i + 1) - 1}{(\Sigma_k \alpha_i + 1) - K}$$

which is the mode of another Dirichlet distribution, namely $dir(\alpha+1)$. This means that Mean-for-Mode sampling is an instance of stochastic expectation maximization.

This point in the design space (i.e., Mean-for-Mode Gibbs sampling) is a sweet spot for GPU implementations: it is highly parallel, while still allowing the use of space-saving optimizations such as sparsity and approximate counters. As indicated above, these optimizations could be used for other mixture models by similarly using point estimates of parameters.

Parallel GPU Implementation

The Mean-for-Mode Gibbs sampler applied to LDA exposes a lot of fine-grained parallelism and enables effective GPU implementations. In the implementation of Mean-for-Mode Gibbs sampler of algorithm 400 of FIG. 4, the data and state of the algorithm is stored using the following arrays and matrices (where $\mathbb{I}$ denotes integers and $\mathbb{F}$ denotes floating-points): words $\in \mathbb{I}^{M \times N}$; phis $\in \mathbb{F}^{K \times V}$; thetas $\in \mathbb{F}^{M \times K}$; tpd $\in \mathbb{I}^{M \times K}$; wpt $\in \mathbb{I}^{K \times V}$; wt $\in \mathbb{I}^{K}$.

Algorithm 400 shows sampling of latent variables. Note that for each document, the embodiment depicted in algorithm 400 launches a separate thread that samples topics for every word in that document. For the target corpuses, the number of documents ranges from tens of thousands to millions, so there is more than enough document-centric parallelism to efficiently make use of GPU resources. Note that embodiments include launching one thread per word in the corpus, or even several threads per word in the corpus. Such embodiments come with interesting tradeoffs regarding the use of local/shared memory on the GPU. For example, the maximum number of threads that can be used effectively may be limited by the amount of shared or local memory.

As each thread selects topics for each token in its document, the thread updates the "wpt" (aka, words per topic), "wt" (aka, words total), and "tpd" (aka, topics per document) matrices. These keep count of how many times each word has been assigned to a particular topic, how many times each topic has been assigned throughout the corpus, and how many times each topic appears in every document, respectively. These counts are used to estimate $\phi$ and $\theta$.

Figure 5:
FIG. 5 depicts an algorithm that shows how $\mathbb{E}[\phi]$ is computed by launching a thread for each entry.

Algorithm 500 of FIG. 5 shows how $\mathbb{E}[\phi]$ is computed by launching a thread for each entry ($\mathbb{E}[\theta]$ is computed similarly).

Optimizing Memory Usage

One challenge of effective GPU implementation of an uncollapsed Gibbs sampler such as Means-for-Mode (or Greedy) Gibbs sampler is decreasing total memory use in order to effectively use GPU resources to implement the Greedy Gibbs sampler, which is addressed by embodiments described herein. After all, the scalability described in the previous section is useful only if there is enough memory to hold the large matrices used in Algorithms 400 and 500. In addition to reducing memory footprint, embodiments improve performance by reducing the amount of memory accesses, thereby improving memory bandwidth-usage.

However, even the basic version of Mean-for-Mode Gibbs sampling described in the previous section has some advantages in these respects over both uncollapsed and collapsed Gibbs samplers. Unlike the uncollapsed Gibbs sampler, Mean-for-Mode does not sample the parameters from Dirichlet distributions. Dirichlet variates are often generated by sampling from Gamma distributions and then normalizing. The shape parameters of these Gamma distributions are computed by adding the priors to the appropriate count from the "wpt" or "tpd" matrix. If $\alpha$ or $\beta$ are very small and the current count from "wpt" or "tpd" is very small, it is quite likely that the unnormalized Gamma variate is not representable with single-precision floating point values. Specifically, it is common to use $\beta$ as small as 0.01, and the smallest positive single precision float is $2^{-149}$. The cumulative distribution function (CDF) of the Gamma distribution with shape 0.01 and scale of 1 at $2^{-149}$ is ≈0.358.

However, when the unnormalized Gamma variate is not representable with single-precision floating point values, uncollapsed Gibbs samplers must store these samples as double precision floating-point values to prevent unintended rounding off to 0. In contrast, the Mean-for-Mode sampler can store its parameters as single-precision floating point values, which are smaller and faster to process. Moreover, some GPU architectures have many more single-precision cores than double-precision cores, and using single-precision parameters achieves greater parallelism on such GPUs.

Although the collapsed Gibbs sampler does not have to store these parameters at all, the trade-off is that it must store the latent variables. This requires space on the order of the total number of tokens in the corpus, and is typically much larger than the parameter matrices when analyzing many documents.

To further lessen the impact of the issues of decreasing total memory use and eliminating unnecessary memory accesses, embodiments implement approximate counters in the Greedy Gibbs sampler to decrease memory usage of the Gibbs sampler. Specifically, embodiments comprise a topic modeling algorithm that replaces standard counters, in a Greedy Gibbs sampler, that are represented as integer variables with approximate counters. An approximate counter allows, for example, an 8-bit byte (or a 4-bit nybble) to be used to represent a statistical approximation to the number of increment operations performed on it.

As such, embodiments of the Greedy Gibbs sampler described herein improve performance of topic discovery. Because approximate counters require less memory than standard counters, the replacement of standard counters with approximate counters streamlines the memory usage of a Gibbs sampler. GPUs have limited memory bandwidth in individual cores, and limited storage. Therefore, reduction of memory requirements for sampling computation allows the GPU to compute more data in less time. Accordingly, embodiments reduce the amount of memory required for the data used in the sampler. According to these embodiments, the Greedy Gibbs sampler is configured to process more data on a single GPU, which, in turn, requires less overall resources to process the data.

For example, in the context of a cluster of machines implementing an embodiment of the Greedy Gibbs sampler described herein, the cluster would require less machines overall when compared to other implementations of topic modeling because of the amount of data that can be processed on a single GPU, which has the added benefit of reducing communication needs between nodes in the cluster.

Furthermore, the described Greedy Gibbs sampler facilitates processing larger datasets, and processes such data sets closer to real time, which is important in cases where streaming data requires constant topic updates to account for the streaming data. The increased capacity of the described embodiments of the Greedy Gibbs sampler facilitate better topic results, and therefore better classifiers, which are very common tools in data analytics.

Approximation of the Counts

In algorithm 400 of FIG. 4, the matrices "wpt" and "tpd" are cleared to zero at the very beginning of the algorithm, and the only updates to their entries are increments. In contrast, with the collapsed Gibbs samplers, the corresponding matrices are never cleared to zero, and updates can be both increments and/or decrements. This feature of the Mean-for-Mode algorithm (and, in general, of uncollapsed algorithms) makes it possible to use approximate counters for the counts in the "wpt" and "tpd" matrices.

An approximate counter is a probabilistic counting algorithm that uses probabilistic techniques to increment the counter. The intuitive idea of approximate counters is to estimate the order of magnitude of the number of increments to the counters. As the simplest example, to increment an approximate counter whose current value is X, the approximate counter increments X with a probability $2^{-X}$, and otherwise the count is not incremented. In the end, a statistically reasonable estimate of the number of increment attempts on the approximate counter is $2^X-1$. This idea can be improved in different ways to allow for different levels of precision (according to Morris approximate counters) or to have a behavior similar to that of a floating-point representation (according to Csűrös approximate counters).

For more information on Morris and Csűrös approximate counters, see the following two documents, the contents of each of which are incorporated herein by reference: Robert Morris. Counting large numbers of events in small registers. *Commun. ACM,* 21(10):840-842, October 1978. Miklós Csűrös. Approximate counting with a floating-point counter. In *Proceedings of the 16th Annual International Conference on Computing and Combinatorics,* COCOON '10, pages 358-367, Berlin, Heidelberg, 2010. Springer-Verlag.)

The benefit of using approximate counters is the potential to greatly reduce the amount of memory required to store counts, since a probabilistic counter requires less memory than a conventional counter. For instance, a conventional counter requires 32 bits and approximate counters can be represented with only 8 bits per counter, or even with 4 bits per counter.

For counters of size 8 bits, the approximation has no apparent consequence on statistical performance of a Gibbs sampler. More surprisingly, perhaps, the approximate counters lead to a gain in runtime performance, despite the fact that an increment of an approximate counter requires drawing from a uniform distribution. This is a result of performing fewer writes to memory when incrementing approximate counters, since each write happens only with some probability, and each read from memory for a warp (synchronized ganged set of SIMD processors) of, for example, 32 processors need load only 32 bytes rather than 128 bytes.

Approximate counters have typically been used as performance counters, to represent more concisely various statistical measurements of the behavior of a computer. It is not at all obvious a priori that approximate counters will produce good results when used in a machine learning algorithm. However, research and experimental measurements have shown that in fact approximate counters can produce good results of good quality with improved performance when used in an uncollapsed LDA Gibbs algorithm coded for a GPU, as described herein.

Research and experimental measurements have also shown that approximate counters do not work well when used in a collapsed LDA Gibbs algorithm; the reason is that the use of decrementation operations on an approximate counter allows the variance of the counter value to grow without bound. In fact, the operations for which approximate counters are generally used are incrementation/addition and resetting to zero. Because of the probabilistic nature of an approximate counter, other applications of approximate counters (such as subtraction, decrementation, etc.) are not in general use because the effects of such other applications of approximate counters is generally unknown. The uncollapsed Gibbs sampler algorithm uses only increment operations and periodically resets all counters to zero, thus limiting the statistical variance of approximate counters.

Array Usage in Gibbs Sampling

As described above, embodiments replace conventional representations of counters in an uncollapsed Gibbs sampler (of which the Greedy Gibbs sampler is a non-limiting example) with approximate counters, which reduces the memory requirements of the Gibbs sampler. Thus, embodiments described herein allow a GPU implementation of a machine-learning algorithm for discovering topics in a training corpus (and then possibly assigning topics to yet other documents) to run approximately 5% faster than a Greedy Gibbs sampler with standard counters running on the same GPU. Embodiments handle significantly larger problem sizes than the more conventional algorithm using standard counters because embodiments use GPU memory more efficiently, allowing certain large arrays used by the algorithm to have 8-bit (or even 4-bit) approximate counters rather than 32-bit standard counters.

To illustrate replacement of 32-bit standard counters with approximate counters, the following Gibbs samplers are described below: a collapsed Gibbs sampler; an uncompressed Gibbs sampler with conventional (or standard) counters; and uncompressed Gibbs samplers with various implementations of approximate counters. In the description of the Gibbs samplers below, notations—that are different from the notations used in the above sections (i.e., in connection with Algorithm 400 of FIG. 4)—are explained and used.

Collapsed Gibbs Sampler

In collapsed Gibbs sampling, four arrays are maintained (in addition to the actual text corpus w, which is also an array). The array z is a two-dimensional ragged array indexed by document number and word occurrence within the document, which for each word occurrence in each document records the (integer) number of the topic that has been (provisionally) assigned to that word. The other arrays contain counters that summarize the contents of the z array in various ways. The array topicCounts is a two-dimensional array of counters indexed by topic number and word within a vocabulary, and it records, for each topic and word, how many occurrences of that word in the document corpus have been assigned that topic. Similarly, documentCounts is a two-dimensional array of counters indexed by document number and topic number, and it records, for each topic and document, how many word occurrences in that document have been assigned that topic.

The last of the four arrays is a summary array of counters topicAssignments that may also be maintained such that topicAssignments[j]=$\Sigma_i$ topicCounts[i,j]. At each step a new value is randomly chosen for some element of z, where the relative probabilities of the possible values (topic numbers) are calculated by examining counter values in topicCounts and documentCounts. A newly chosen z value represents a new random choice j' of topic (replacing a previous value j) for a given word i occurring in a given document k; after that value is chosen, counters topicCounts[i,j], topicAssignments[j], and documentCounts[k,j] are decremented, and then counters topicCounts[i,j'], topicAssignments[j'], and documentCounts[k,j'] are incremented. Typically these counters are 32-bit integers.

The collapsed Gibbs sampling strategy is sequential. It is important that elements of z be processed sequentially, so that after a new z value is chosen, the counters are updated before the next new z value is chosen. If the z values are not processed sequentially, then the computation typically requires many more iterations to converge, and moreover the quality of the computed result suffers. This requirement for sequential processing is the motivation for maintaining the counters incrementally using both increment and decrement operations; it would be infeasible to only use increment operations on the counters for a collapsed Gibbs sampler because it would be computationally expensive to reset the counters to zero and then recompute the counter values from scratch after every change to the z array.

Uncollapsed Gibbs Sampler

In uncollapsed Gibbs sampling, two arrays $\theta$ and $\phi$ of floating-point parameters are maintained in addition to the four arrays already described in connection with collapsed Gibbs sampling. Each overall iteration of the computation of an uncollapsed Gibbs sampler first clears the arrays of counters, then processes the entire z array at once, choosing new values for every element of z independently (and therefore possibly in parallel).

The relative probabilities of the possible values (topic numbers) are calculated not by examining counter values in topicCounts and documentCounts, but by examining the arrays $\theta$ and $\phi$. As new z values are chosen, counter values are also updated, but using only increment operations (and not decrement operations). After all new z values have been chosen (and therefore the arrays of counters have also been completely computed), then new values for the elements of the $\theta$ and $\phi$ arrays are computed from the arrays of counters.

Pseudocode Describing an Uncollapsed Gibbs Sampler

Figure 6:
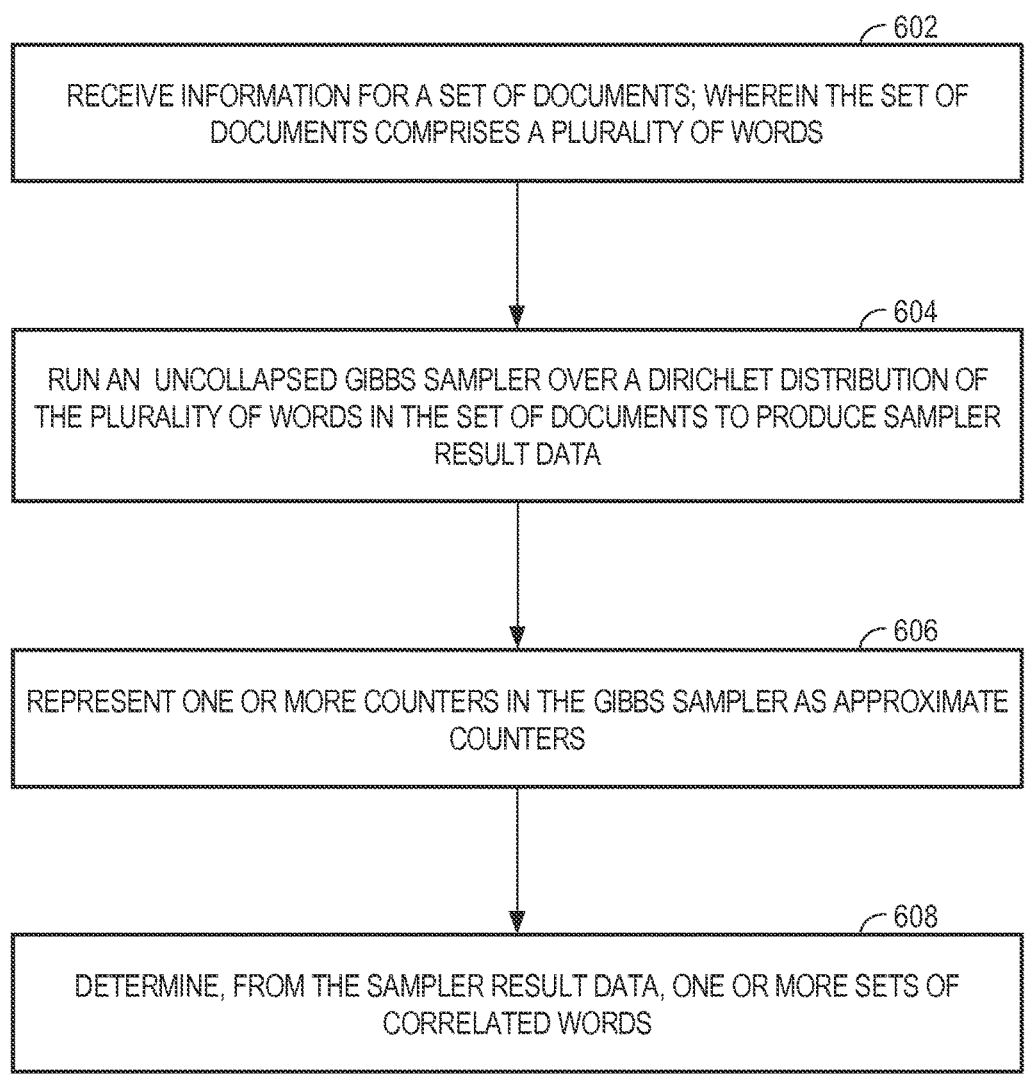
FIG. 6 depicts a flowchart for representing counts, in an uncollapsed Gibbs sampler, using approximate counters.

FIG. 6 depicts a flowchart 600 for representing counts, in an uncollapsed Gibbs sampler, using approximate counters. To help illustrate flowchart 600, implementations of uncollapsed Gibbs samplers are described in various versions of pseudocode included below. To be clear, while Pseudocode I describes an uncollapsed Gibbs sampler (and a Gibbs sampler with at least one variable uncollapsed is the basis for flowchart 600), Pseudocode I does not describe using approximate counters (see step 606 of flowchart 600) as do Pseudocodes II, III, and IV.

At step 602 of flowchart 600, information for a set of documents is received; wherein the set of documents comprises a plurality of words. For example, a user provides information about document set 142 (database 140) to sampling client 112 (client device 110). In this example, document set 142 is a set of web pages gathered by a web crawler. Sampling client 112 provides the information to sampling service 124 (of server device 120).

Document set 142 includes one or more documents, which is a set of unlabeled data, where each document includes words. As such, each particular document in document set 142 includes words that may be correlated by a Gibbs sampler. According to an embodiment, a user also provides sampling service 124 a number of topics (K) into which the Gibbs sampler should correlate the words from document set 142.

In connection with the following pseudocode, including Pseudocode I, for a Latent Dirichlet Allocation model of unlabeled data—i.e., document set 142—to which sampling service 124 assigns topics probabilistically using Gibbs sampling, let M be the number of documents, K be the number of topics, and V be the size of the vocabulary, which is a set of distinct words found within the document set. More specifically, each document is a list of occurrences of words, each of which belongs to the vocabulary; any given word can appear in any number of documents, and may appear any number of times in any single document. The documents may be of different lengths.

At step 604 of flowchart 600, an uncollapsed Gibbs sampler over a Dirichlet distribution of the plurality of words in the set of documents is run to produce sampler result data. For example, sampling service 124 runs an uncollapsed Gibbs sampler as represented in Pseudocode I (which describes an uncollapsed Gibbs sampler running over a Dirichlet distribution of the plurality of words in a set of documents to produce sampler result data). In the phase of Gibbs sampling that draws new z values, given θ and φ values, sampling service 124 runs the uncollapsed Gibbs sampler, which increments counters selected by the new z values. Because no z value depends on any other z value in an uncollapsed Gibbs sampler, new z values may all be computed independently (and therefore in parallel to any extent desired).

It is assumed that the matrix θ is a M×K matrix and the matrix φ is a V×K matrix. It is also assumed that the elements of these matrices are non-negative numbers, typically represented in a computer as floating-point values. The following are also assumed to be given:
(i) a length-M vector of nonnegative integers N such that N[m] is the length of document m; and
(ii) an M×N ragged array w (i.e., where, for 0≤m<M, w[m] is a vector of length N[m]). (Zero-based indexing is used throughout this document.) Each element of w is less than V and may therefore be used as a first index for φ.

Sampling service 124—given K, M, V, N, φ, θ, and w and using two temporary M×N×K ragged work arrays a and p—computes all of the elements for a M×N ragged array z as follows: For all m such that 0≤m<M and for all i such that 0≤i<N[m], sampling service 124 performs both of:
  first, for all k such that 0≤k<K, let a[m][i][k]=θ[m, k]×φ[w[m,i], k];
  second, let z[m, i] be a nonnegative integer less than K, chosen randomly in such a way that the probability of choosing the value k' is a[m][i][k']/σ where $\sigma = \Sigma_{0 \le k < K}$ a[m][i][k]. (Thus, a[m][i][k'] is a relative (unnormalized) probability, and a[m][i][k']/a is an absolute (normalized) probability.)

Then, after sampling service 124 chooses a value j for z[m, i], sampling service 124 increments three counters that are elements of three respective arrays of integer counters, respectively called topicCounts, topicAssignments, and documentCounts. For each of the three arrays, the value j is used as part of the process of selecting the specific counter to be incremented. Typically each of these counters, implemented conventionally, is 32 bits in size.

The following pseudocode, referred to as "Pseudocode I" describes a version of such an algorithm, i.e., an uncompressed Gibbs sampler implementing conventional counters. In the pseudocode, a "let" statement creates a local binding of a scalar (single-valued) variable and gives it a value, that a "local array" declaration creates a local binding of an array variable (containing an element value for each indexable position in the array), and that distinct iterations of a "for" or "for all" construct are understood to create distinct and independent instantiations of such local variables for each iteration. The iterations of a "for" construct are understood to be executed sequentially in a specific order, and this is emphasized in the pseudocode by the use of the word "sequentially". However, the iterations of a "for all" construct are intended to be computationally independent and therefore, according to embodiments, may be executed in any order, or in parallel, or in any sequential-parallel combination. Also, statements after "//" symbols are comments on the pseudocode that are included for purposes of illustration of the pseudocode.

```
 1: // "Pseudocode I" describing a straightforward algorithm for drawing new z values
 2: procedure DrawZ (K, M, V, N[M], θ[M, K], φ[V, K], w[M][N]; output z[M, N])
 3:     local array a[M][N][K], p[M][N][K]
 4:     for all 0 ≤ m < M do
 5:         for all 0 ≤ i < N[m] do
 6:             //Compute θ·φ products
 7:             for all 0 ≤ k < K do
 8:                 a[m][i][k] ← θ[m, k] × φ[w[m][i], k]
 9:             end for
10:             //Compute partials sums of the products
11:             begin
12:                 let sum ← 0.0
13:                 for k sequentially from 0 through K − 1 do
14:                     sum ← sum + a[m][i][k]
15:                     p[m][i][k] ← sum
16:                 end for
17:             end
18:             //Search the table of partials sums
19:             begin
20:                 let u ← random value chosen uniformly from the real interval [0.0, 1.0)
21:                 let stop ← sum × u
22:                 let j ← 0
23:                 //Linear search of table p[m][i]
24:                 while j < K − 1 and stop ≥ p[m][i][j] do
25:                     j ← j + 1
26:                 end while
27:                 z[m, i] ← j
28:             end
29:             //Increment three counters
30:             atomically topicCounts[w[m][i]][j] ← topicCounts[w[m][i]][j] + 1
31:             atomically topicAssignments[j] ← topicAssignments[j] + 1
32:             atomically documentCounts[m][j] ← documentCounts[m][j] + 1
33:         end for
34:     end for
35: end procedure
```

The computation of the θ-φ products (Pseudocode I, lines 7-9) is straightforward. The computation of partial sums (Pseudocode I, lines 11-17) is sequential. The variable sum accumulates the products, and successive values of sum are stored into the array p.

A random integer is chosen for z[m, i] by choosing a random value uniformly from the range [0.0, 1.0), scaling it by the final value of sum (which has the same algorithmic effect as dividing p[m][i][k] by that value, for all 0≤k<K, to turn it into an absolute probability), and then searching the subarray p[m][i] to find the smallest entry that is larger than the scaled random value (and if there are several such entries, all equal, then the one with the smallest index is chosen); the index k of that entry is used as the desired randomly chosen integer. (See Pseudocode I, lines 19-28.) Note that because all elements of θ and φ are nonnegative, the products stored in a are also nonnegative, and therefore each subarray p[m][i] is monotonically nondecreasing; that is, for all 0≤m<M, 0≤i<N[m], and 0<k<K, then it is true that p[m][i][k−1]≤p[m][i][k].

Once an integer value j has been chosen as the topic z[m, i] for word i of document m, three counters are incremented—one counter within each of three arrays of counters (see Pseudocode I, lines 30-32). The array topicCounts keeps track, for each word in the vocabulary and for each topic, how many times that word has been assigned to that topic. The array topicAssignments keeps track, for each topic, how many times that topic has been assigned to any word. The array documentCounts keeps track, for each document and each topic, how many distinct word occurrences in that document have been assigned to that topic. If iterations of the "for all" loops in the algorithm may be executed in parallel, then it is necessary to perform the incrementations using atomic assignments.

In an embodiment, the "for all" loop on m (starting on Pseudocode I, line 4) executes its iterations partly or entirely in parallel, but the "for all" loop on i (starting on Pseudocode I, line 5) executes its iterations sequentially, and therefore incrementation of an element of the documentCounts array does not require the use of an atomic assignment or other synchronization facility, so that the statement on line 32 of Pseudocode I may be written simply as:
documentCounts[m][j]←documentCounts[m][j]+1

After the "DrawZ" procedure has completed, other parts of the code read the values of the counters in these arrays and use these values for further computations, for example to draw new values for the θ and φ arrays.

Approximate Counters

At step 606 of flowchart 600, running an uncollapsed Gibbs sampler over a Dirichlet distribution of the plurality of words in the set of documents to produce sampler result data, comprises representing one or more counts in the Gibbs sampler using one or more approximate counters. For example, sampling service 124 runs an uncollapsed Gibbs sampler as represented in one of Pseudocodes II, III, or IV, which are described in further detail below.

Thus, according to embodiments, sampling service 124 represents counts in an uncollapsed Gibbs sampler (e.g., the counts represented in topicCounts, topicAssignments, and documentCounts) using approximate counters. In one embodiment implementing an uncollapsed Gibbs sampler that makes use of a GPU, such as GPU 122, the topicCounts, topicAssignments, and documentCounts arrays are kept in the memory of GPU 122, along with other arrays, and the total amount of data (all words in all documents) that can be processed is limited by the amount of memory provided by GPU 122. Reducing the total size in bits of the topicCounts, topicAssignments, and documentCounts arrays (i.e., by replacing 32-bit conventional counters with 8-bit or 4-bit approximate counters) allows more data to be processed by GPU 122.

LDA Gibbs with Binary Morris Approximate Counters

In one embodiment, the counts in the three arrays of counters are represented with binary Morris approximate counters, in which each counter uses 8 bits rather than 32 bits. For a binary Morris approximate counter, incrementations are performed only probabilistically, and the integer value in such an approximate counter is approximately the base-2 logarithm of the number of prior incrementation attempts. More precisely, if the binary Morris approximate counter holds the integer value n, then $2^n-1$ is a statistically reasonable estimate of the number of prior incrementation attempts.

According to this embodiment, the three lines of code in the "DrawZ" procedure that increment counters, that is, Pseudocode I, lines 30-32, are replaced by other code, producing version 2 of the "DrawZ" procedure (referred to herein as "Pseudocode II"):

```
1:  //Pseudocode II: Drawing new z values, then incrementing binary Morris counters
2:  procedure DrawZ (K, M, V, N[M], θ[M, K ], φ[V, K], w[M][N]; output z[M, N])
3:      local array a[M][N][K], p[M][N][K]
4:      for all 0 ≤ m < M do
5:          for all 0 ≤ i < N[m] do
6:              //Compute θ-φ products
7:              for all 0 ≤ k < K do
8:                  a[m][i][k] ← θ[m, k] × φ[w[m][i], k]
9:              end for
10:             //Compute partials sums of the products
11:             begin
12:                 let sum ← 0.0
13:                 for k sequentially from 0 through K − 1 do
14:                     sum ← sum + a[m][i][k]
15:                     p[m][i][k] ← sum
16:                 end for
17:             end
18:             //Search the table of partials sums
19:             begin
20:                 let u ← random value chosen uniformly from the real interval [0.0, 1.0)
21:                 let stop ← sum × u
22:                 let j ← 0
23:                 //Linear search of table p[m][i]
24:                 while j < K − 1 and stop ≥ p[m][i][j] do
25:                     j ← j + 1
```

```
26:            end while
27:            z[m, i] ← j
28:         end
29:         //Increment three counters
30:         repeat
31:            let n ← topicCounts[w[m][i]][j]
32:            let C ← collection of n uniformly pseudorandomly chosen bits
33:         until (some bit in C is nonzero or else
                        compareAndSwap(topicCounts[w[m][i]][j], n, n + 1) succeeds)
34:         repeat
35:            let n ← topicAssignments[j]
36:               let C ← collection of n uniformly pseudorandomly chosen bits
37:            until (some bit in C is nonzero or else compareAndSwap(topicAssignments[j], n,
                        n + 1) succeeds)
38:         repeat
39:            let n ← documentCounts[m][j]
40:            let C ← collection of n uniformly pseudorandomly chosen bits
41:            until (some bit in C is nonzero or else compareAndSwap(documentCounts[m][j],
                        n, n + 1) succeeds)
42:      end for
43:   end for
44: end procedure
```

Finally, in other parts of the algorithm, partly represented in Pseudocode II, that read the counters:

each read access topicCounts[a][j] is replaced by the expression $((1 \ll \text{topicCounts}[a][j])-1)$;

each read access topicAssignments[j] is replaced by the expression $((1 \ll \text{topicAssignments}[j])-1)$; and each read access documentCounts[m][j] is replaced by the expression $((1 \ll \text{documentCounts}[m][j])-1)$.

In the above expressions, '$\ll$' is the arithmetic left-shift operator (thus $((1 \ll n)-1)$ computes the mathematical quantity $2n-1$). Code that initializes the counters to zero remains unchanged (except for the fact that the elements being cleared are 8 bits wide rather than 32 bits wide).

In this manner each element of each of the three arrays of counters is treated as a binary Morris approximate counter: incrementations are performed only probabilistically, and the integer value in an approximate counter is approximately the base-2 logarithm of the number of prior incrementation attempts (more precisely, if the approximate counter holds the integer value n, then $2^n-1$ is a statistically reasonable estimate of the number of prior incrementation attempts).

In another embodiment, the "for all" loop (starting at Pseudocode II, line 5) executes its iterations sequentially, and lines 38-41 of Pseudocode II that increment the counter documentCounts[m][j] are replaced with the following:

```
1: begin
2:    let n ← documentCounts[m][j]
3:    let C ← collection of n uniformly pseudorandomly chosen bits
4:    if every bit in C is zero then
5:       documentCounts[m][j] ← n+1
6:    end if
7: end
```

LDA Gibbs with General Morris Approximate Counters

In another embodiment, the three arrays of counters (i.e., topicCounts, topicAssignments, and documentCounts) again contain counters represented as 8 bits rather than 32 bits, and again the three lines of code in the "DrawZ" procedure (of Pseudocode I) that increment counters are replaced by other code, producing version 3 of the "DrawZ" procedure (referred to herein as Pseudocode III). In this pseudocode, it is assumed that q is a preselected floating-point constant such that $1 < q < 2$.

In one embodiment, $q=1.1$. In the context of a Gibbs sampler, the upper bound for the general Morris counter that is produced when $q=1.1$ is a more reasonable number, in light of the counts that are reasonably expected for the Gibbs sampler, than the upper bound for the binary Morris counter. As such, using 1.1 as the value for q results in at least somewhat more accurate counts for the Gibbs sampler than using the value 2 for q (as in the binary Morris counter).

```
1: //Pseudocode III: Drawing new z values, then incrementing general Morris counters
2: procedure DrawZ(K, M, V, N[M], θ[M,K], φ[V,K], w[M][N]; output z[M,N])
3:    local array a[M][N][K], p[M][N][K]
4:    forall 0 ≤ m < M do
5:       for all 0 ≤ i < N[m] do
6:          // Compute θ-φ products
7:          for all 0 ≤ k < K do
8:             a[m][i][k] ← θ[m, k] × φ[w[m][i], k]
9:          end for
10:         // Compute partials sums of the products
11:         begin
12:            let sum ← 0.0
13:            for k sequentially from 0 through K − 1 do
14:               sum ← sum + a[m][i][k]
15:               p[m][i][k] ← sum
16:            end for
17:         end
18:         // Search the table of partials sums
19:         begin
20:            let u ← random value chosen uniformly from the real interval [0.0, 1.0)
```

```
21:             let stop ← sum × u
22:             let j ← 0
23:             // Linear search of table p[m][i]
24:             while j < K − 1 and stop ≥ p[m][i][j] do
25:                 j ← j + 1
26:             end while
27:             z[m, i] ← j
28:         end
29:         // Increment three counters
30:         repeat
31:             let n ← topicCounts[w[m][i]][j]
32:             let u ← floating-point value chosen uniformly pseudorandomly from the
                      interval [0, 1)
33:         until (u ≥ q⁻ⁿ or else compareAndSwap(topicCounts[w[m][i]][j], n, n + 1)
                      succeeds)
34:         repeat
35:             let n ← topicAssignments[j]
36:             let u ← floating-point value chosen uniformly pseudorandomly from the
                      interval [0, 1)
37:         until (u ≥ q⁻ⁿ or else compareAndSwap(topicAssignments[j], n, n + 1) succeeds)
38:         repeat
39:             let n ← documentCounts[m][j]
40:             let u ← floating-point value chosen uniformly pseudorandomly from the
                      interval [0, 1)
41:         until (u ≥ q⁻ⁿ or else compareAndSwap(documentCounts[m][j], n, n + 1)
                      succeeds)
42:     end for
43:   end for
44: end procedure
```

Finally, in other parts of the algorithm, partly represented in Pseudocode III, that read the counters:
each read access topicCounts[a][j] is replaced by the expression ((pow(q, topicCounts[a][j])−1)/(q−1));
each read access topicAssignments[j] is replaced by the expression ((pow(q, topicAssignments[j])−1)/(q−1)); and
each read access documentCounts[m][j] is replaced by the expression ((pow(q, documentCounts[m][j])−1)/(q−1)).

In the above expressions, pow(x, y) is function that raises x to the power y. Thus, if the integer value of an approximate counter is n, the expression ((pow(q, n)−1)/(q−1)) computes the mathematical quantity $$\frac{q^n - 1}{q - 1}.$$

Code that initializes the counters to zero remains unchanged (except for the fact that the elements being cleared are 8 bits wide rather than 32 bits wide).

In this manner, each element of each of the three arrays of counters is treated as an approximate counter of the general kind as described by Morris: incrementations are performed only probabilistically, and the integer value in an approximate counter is approximately the base-q logarithm of the number of prior incrementation attempts (more precisely, if the approximate counter holds the integer value n, then $$\frac{q^n - 1}{q - 1}$$

is a statistically reasonable estimate of the number of prior incrementation attempts).

In an embodiment, the "for all" loop starting at Pseudocode III, line 5 executes its iterations sequentially, and Pseudocode III, lines 38-41 that increment the counter documentCounts[m][j] is replaced with the following code:

```
1: begin
2:     let n ← documentCounts[m][j]
3:     let u ← floating-point value chosen uniformly pseudorandomly
           from the interval [0, 1)
4:     if u < q⁻ⁿ then
5:         documentCounts[m][j] ← n+1
6:     end if
7: end
```

LDA Gibbs with Csűrös Approximate Counters

In an embodiment, the three arrays of counters (i.e., topicCounts, topicAssignments, and documentCounts) again contain counters represented as 8 bits rather than 32 bits, and again the three lines of code in the "DrawZ" procedure (of Pseudocode I) that increment counters are replaced by other code, producing version 4 of the "DrawZ" procedure (referred to herein as Pseudocode IV). In Pseudocode IV, '<<' is the arithmetic left-shift operator such that x<<n computes the mathematical value x2ⁿ. Further, '>>' is the arithmetic right-shift operator such that x>>n computes the mathematical value $$\left\lfloor \frac{x}{2^n} \right\rfloor,$$

and & is the bitwise AND operator on two binary integers. In Pseudocode IV, it is assumed that s is a preselected non-negative integer. In one embodiment, s=4; in another embodiment, s=5.

```
 1: //Pseudocode IV: Drawing new z values, then incrementing Csűrös counters
 2: procedure DrawZ(K, M, V, N[M], θ[M, K], φ[V, K], w[M][N]; output z[M, N])
 3:     local array a[M][N][K], p[M][N][K]
 4:     for all 0 ≤ m < M do
 5:         for all 0 ≤ i < N[m] do
 6:             // Compute θ-φ products
 7:             for all 0 ≤ k < K do
 8:                 a[m][i][k] ← θ[m, k] × φ[w[m][i], k]
 9:             end for
10:             // Compute partials sums of the products
11:             begin
12:                 let sum ← 0.0
13:                 for k sequentially from 0 through K − 1 do
14:                     sum ← sum + a[m][i][k]
15:                     p[m][i][k] ← sum
16:                 end for
17:             end
18:             // Search the table of partials sums
19:             begin
20:                 let u ← random value chosen uniformly from the real interval [0.0, 1.0)
21:                 let stop ← sum × u
22:                 let j ← 0
23:                 // Linear search of table p[m][i]
24:                 while j < K − 1 and stop ≥ p[m][i][j] do
25:                     j ← j + 1
26:                 end while
27:                 z[m, i] ← j
28:             end
29:             // Increment three counters
30:             repeat
31:                 let n ← topicCounts[w[m][i]][j] >> s
32:                 let C ← collection of n uniformly pseudorandomly chosen bits
33:             until (some bit in C is nonzero or else compareAndSwap(topicCounts[w[m][i]][j],
                           n, n + 1) succeeds)
34:             repeat
35:                 let n ← topicAssignments[j] >> s
36:                 let C ← collection of n uniformly pseudorandomly chosen bits
37:             until (some bit in C is nonzero or else compareAndSwap(topicAssignments[j], n,
                           n + 1) succeeds)
38:             repeat
39:                 let n ← documentCounts[m][j] >> s
40:                 let C ← collection of n uniformly pseudorandomly chosen bits
41:             until (some bit in C is nonzero or else compareAndSwap(documentCounts[m][j],
                           n, n + 1) succeeds)
42:         end for
43:     end for
44: end procedure
```

Finally, in other parts of the algorithm, partly represented in Pseudocode IV, that read the counters, each read access that fetches an integer value n from an approximate counter then uses the expression $((2^s+n \,\&\, (2^s-1))<<(n>>s))-2^s$ to compute a statistical approximation to the number of prior incrementation attempts. Code that initializes the counters to zero remains unchanged (except for the fact that the elements being cleared are 8 bits wide rather than 32 bits wide).

In this manner, each element of each of the three arrays of counters is treated as an approximate counter of the general kind as described by Csűrös: incrementations are performed only probabilistically, and the integer value in an approximate counter is a kind of specialized floating-point representation from which an estimate of the number of prior incrementation attempts can be computed. More precisely, if the Csűrös approximate counter holds the integer value n, then $(2^s+(n \bmod 2^s))2^{\lfloor n/2^s \rfloor}-2^s$ is a statistically reasonable estimate of the number of prior incrementation attempts.

In another embodiment, the "for all" loop starting at Pseudocode IV, line 5 executes its iterations sequentially, and lines 38-41 of Pseudocode IV that increment the counter documentCounts[m][j] is replaced with the following code:

```
1: begin
2:     let n ← documentCounts[m][j] >> s
3:     let C ← collection of n uniformly pseudorandomly chosen bits
4:     if every bit in C is zero then
5:         documentCounts[m][j] ← n+1
6:     end if
7: end
```

Results of Running the Sampler

Again returning to flowchart 600 of FIG. 6, at step 608, one or more sets of correlated words are determined from the sampler result data. For example, sampling service 124 continues to run the Gibbs sampler—represented in one of the versions of the Pseudocode (II, III, or IV) described above—over the data in document set 142 until a satisfactory level of convergence is detected. A satisfactory level of convergence may be detected based on one or more of: a number of iterations of the Gibbs sampler, the likelihood of the parameters does not increase significantly anymore, the perplexity of the parameters does not decrease anymore, etc.

Once convergence is reached, sampling service 124 has, through the Gibbs sampler, assigned each word of the plurality of words in each document of document set 142 a particular topic. According to an embodiment, the plurality of words is less than all of the words in the documents of document set 142. According to an embodiment, the plurality of words is all of the words in the documents of document set 142. According to embodiments, sampling service 124 returns, to sampling client 112, information for K number of lists of correlated words identified from document set 142.

According to an embodiment, the sets of correlated words are not automatically associated with topic names, or interpretations of the identified correlations, etc. Specifically, the word groupings are based on correlations that were automatically detected in the given set of documents via the Gibbs sampler. For example, sampling service 124 identifies a correlation between two words based on the inclusion of the two words together in a single document of document set 142. In a similar vein, sampling service 124 identifies a strong correlation between the two words based on the inclusion of the two words together in each of multiple documents. As a further example, sampling service 124 identifies a strong correlation between the two words based on the inclusion of two words together in the same sentence in one or more of the documents.

Additional Remarks

Upon initial inspection, it is far from obvious that using approximate counters rather than conventional counters allows the LDA Gibbs algorithm to function effectively. For example, approximate counters introduce statistical variation to a system, and it is not obvious that this introduced statistical variation would not overwhelm the statistical properties of a large mixture model, such as LDA, or a clustering algorithm such as the Gibbs sampler.

However, experimentation and careful measurements show that introduction of approximate counters into the LDA Gibbs sampler algorithm in fact does allow the algorithm to function effectively. Moreover, the use of approximate counters in some cases allows the algorithm to execute more quickly (up to 5% faster) than a similar algorithm using conventional counters, despite the fact that the incrementation and access procedures for approximate counters are more complicated than for conventional counters. It appears that the speed increase results from the fact that there is less memory traffic because actual changes to the values stored at the approximate counters (especially changes accomplished through a compareAndSwap operation) are performed conditionally and, in practice, relatively rarely.

The LDA Gibbs algorithm implemented on a GPU with binary Morris, general Morris, and Csűrös approximate counters each converge with good speed. The binary Morris counters are rather coarse-grained; the effect of this is to waste some bits. The wasted bits affects the performance of the LDA Gibbs algorithm, since the Gibbs sampler that uses binary Morris counters converges to a somewhat lower log-likelihood figure-of-merit. General Morris approximate counters with q=1.1 and Csűrös approximate counters perform about the same, and cause the LDA Gibbs algorithm to converge to roughly the same log-likelihood figure-of-merit achieved using conventional counters.

Just as one can use counters of different sizes in the original LDA Gibbs algorithm (for example, using 16-bit counters in the documentCounts array if it is known that no document contains more than 65,535 words), so one can use approximate counters of various sizes as well. Embodiments are described herein that use 8 bits for each approximate counter, but embodiments comprise approximate counters represented using less than 8 bits—or more than 8 bits.

For example, in alternate embodiments, the approximate counters are each represented using 4, 5, 6, 7, 10, or 12 bits.

Moreover, when using general Morris counters, the parameter q may be chosen to be a value other than 1.1, and when using Csűrös counters, the parameter s may be chosen to be an integer other than 4 or 5.

Furthermore, according to embodiments, counter sizes and/or parameter values used in the three arrays need not all be the same. For example, one might use 4-bit or 5-bit approximate counters in the documentCounts array while using 8-bit counters in the topic Counts and topicAssignments arrays. Also, embodiments implement a mixture of conventional and approximate counters, for example using approximate counters in the topic Counts and documentCounts arrays but using ordinary 32-bit integer counters in the topicAssignments array.

Embodiments further use a mixture of types of approximate counters. For example using general Morris approximate counters in the topic Counts array, using Csűrös approximate counters in the documentCounts array, and using ordinary 32-bit integer counters in the topicAssignments array. Finally, there are other representations and algorithms for approximate counters, such as the two presented by Dice, Lev, and Moir (one in which the representation is similar to that of Csűrös, and one in which the representation in the counter is the probability that the counter value should change on an incrementation operation). According to an embodiment, a Dice, Lev, and Moir approximate counter is used as part of an LDA Gibbs algorithm. For more information on Dice, Lev, and Moir approximate counters, see the following document, the contents of which are incorporated herein by reference: Dave Dice, Yossi Lev, and Mark Moir. Scalable statistics counters. In *Proceedings of the 18th ACM SIGPLAN Symposium on Principles and Practice of Parallel Programming*, PPoPP '13, pages 307-308, New York, N.Y., USA, 2013. ACM.

In an alternate embodiment, incrementation of at least one kind of approximate counter is coded to "saturate," that is, to allow the counter to remain at the highest representable value when its value is incremented rather than "wrap around" to zero or to the most negative integer (depending on whether one is using respectively unsigned or signed integers). For example, in one embodiment, 8-bit unsigned integers are used as binary Morris approximate counters, and the code for incrementing documentCounts[m][j] is as follows:

```
1: repeat
2:     let n ← documentCounts[m][j]
3:     let C ← collection of n uniformly pseudorandomly chosen bits
4: until (some bit in C is nonzero or else
            n = 2^8 − 1 or else
            compareAndSwap(documentCounts[m][j], n, n + 1) succeeds)
```

The amount of memory saved by the use of approximate counters depends on a number of parameters, but as an example, suppose that M (the number of documents) is very large compared to the vocabulary size V (for example, tens of millions of documents but only tens of thousands of words in the vocabulary), and also suppose that the number of topics K is approximately equal to the average number of words per document A (perhaps 100 to 300) and less than $2^{16}$. Then the calculations of the amount of memory needed for each of the seven principal arrays are applied, as depicted in chart 700 of FIG. 7.

Under the assumption that M is much larger than V, the arrays φ and topicCounts and topicAssignments are negligibly small; then under our assumption that K is comparable to A, the totals of the last three columns of chart 700 (i.e., columns 730, 740, and 750) are approximately in the ratio $$14::11::\frac{21}{2},$$

and therefore using 8-bit approximate counters allows handling a database approximately $$\frac{14-11}{11} = 27\%$$

larger than using conventional 32-bit integer counters, and using 4-bit approximate counters allows handling a database approximately $$\frac{14-\frac{21}{2}}{\frac{21}{2}} = 33\%$$

larger than using conventional 32-bit integer counters.

Conclusion

By using approximate counters for the matrices of counts, embodiments greatly reduce the memory footprint and memory bandwidth usage of the algorithm and process more data on a highly-parallel architecture such as a GPU. In the context of the GPU, reducing the memory footprint and bandwidth usage is crucial given the scalability characteristics of the algorithm on this architecture.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for identifying sets of correlated words comprising:
    running an uncollapsed Gibbs sampler over a Dirichlet distribution of a plurality of words in a set of documents to produce sampler result data, further comprising:
        representing one or more counts in the uncollapsed Gibbs sampler using one or more approximate counters, and
        using one or more probabilistic techniques to increment the one or more approximate counters; and
    determining, from the sampler result data, one or more sets of correlated words;
    wherein the method is performed by one or more computing devices.

2. The method of claim 1, wherein the one or more approximate counters comprise binary Morris approximate counters.

3. The method of claim 1, wherein the one or more approximate counters comprise general Morris approximate counters.

4. The method of claim 1, wherein the one or more approximate counters comprise Csűrös approximate counters.

5. The method of claim 1, wherein running the uncollapsed Gibbs sampler over the Dirichlet distribution of the plurality of words in the set of documents to produce sampler result data, further comprises representing one or more other counts in the uncollapsed Gibbs sampler using one or more conventional counters.

6. The method of claim 1, wherein the one or more approximate counters comprise two or more of: binary Morris approximate counters, general Morris approximate counters, Csűrös approximate counters, or conventional counters.

7. The method of claim 1, wherein:
    running the uncollapsed Gibbs sampler over the Dirichlet distribution comprises computing in parallel a plurality of values, including the one or more counts, for the uncollapsed Gibbs sampler; and
    the plurality of values are computed in a plurality of parallel Single Program Multiple Data (SPMD) units on a graphics processing unit (GPU).

8. The method of claim 1, further comprising representing each of the one or more approximate counters using eight bits or fewer than eight bits.

9. The method of claim 1, wherein the uncollapsed Gibbs sampler has at least one variable uncollapsed.

10. The method of claim 1, wherein the uncollapsed Gibbs sampler is a Greedy Gibbs sampler.

11. One or more non-transitory computer-readable media storing one or more sequences of instructions for identifying sets of correlated words, wherein said one or more sequences of instructions, when executed by one or more processors, cause:
    running an uncollapsed Gibbs sampler over a Dirichlet distribution of a plurality of words in a set of documents to produce sampler result data, further comprising:
        representing one or more counts in the uncollapsed Gibbs sampler using one or more approximate counters, and
        using one or more probabilistic techniques to increment the one or more approximate counters; and
    determining, from the sampler result data, one or more sets of correlated words.

12. The one or more non-transitory computer-readable media of claim 11, wherein the one or more approximate counters comprise binary Morris approximate counters.

13. The one or more non-transitory computer-readable media of claim 11, wherein the one or more approximate counters comprise general Morris approximate counters.

14. The one or more non-transitory computer-readable media of claim 11, wherein the one or more approximate counters comprise Csűrös approximate counters.

15. The one or more non-transitory computer-readable media of claim 11, wherein running the uncollapsed Gibbs sampler over the Dirichlet distribution of the plurality of words in the set of documents to produce sampler result data, further comprises representing one or more other counts in the uncollapsed Gibbs sampler using one or more conventional counters.

16. The one or more non-transitory computer-readable media of claim 11, wherein the one or more approximate counters comprise two or more of: binary Morris approximate counters, general Morris approximate counters, Csűrös approximate counters, or conventional counters.

17. The one or more non-transitory computer-readable media of claim 11, wherein:

running the uncollapsed Gibbs sampler over the Dirichlet distribution comprises computing in parallel a plurality of values, including the one or more counts, for the uncollapsed Gibbs sampler; and the one or more sequences of instructions include instructions, that when executed by one or more processors, cause the plurality of values to be computed in a plurality of parallel Single Program Multiple Data (SPMD) units on a graphics processing unit (GPU).

18. The one or more non-transitory computer-readable media of claim 11, wherein the one or more sequences of instructions include instructions, that when executed by one or more processors, cause representing each of the one or more approximate counters using eight bits or fewer than eight bits.

19. The one or more non-transitory computer-readable media of claim 11, wherein the uncollapsed Gibbs sampler has at least one variable uncollapsed.

20. The one or more non-transitory computer-readable media of claim 11, wherein the uncollapsed Gibbs sampler is a Greedy Gibbs sampler.

* * * * *

UNITED STATES PATENT AND TRADEMARK OFFICE
CERTIFICATE OF CORRECTION

PATENT NO. : 10,147,044 B2
APPLICATION NO. : 14/820169
DATED : December 4, 2018
INVENTOR(S) : Steele, Jr. et al.

Page 1 of 1

It is certified that error appears in the above-identified patent and that said Letters Patent is hereby corrected as shown below:

On the Title Page

On page 3, Column 2, under Other Publications, Line 12, after "Factorgraphs" insert -- In --.

In the Specification

In Column 18, Line 64, delete "&" and insert -- '&' --, therefor.

Signed and Sealed this
Seventeenth Day of December, 2019

Andrei Iancu
*Director of the United States Patent and Trademark Office*